United States Patent [19]

Wegener

[11] 3,824,564

[45] July 16, 1974

[54] INTEGRATED THRESHOLD MNOS MEMORY WITH DECODER AND OPERATING SEQUENCE

[75] Inventor: Horst A. R. Wegener, Carlisle, Mass.

[73] Assignee: Sperry Rand Corporation, New York, N.Y.

[22] Filed: July 19, 1973

[21] Appl. No.: 380,782

[52] U.S. Cl. .......... 340/173 R, 307/238, 340/172.5, 340/173 DR

[51] Int. Cl. .......................... G11c 7/00, G11c 11/40

[58] Field of Search ...... 340/173 R, 173 DR, 172.5, 340/173 FF; 307/238

[56] References Cited

UNITED STATES PATENTS

| | | | |
|---|---|---|---|
| 3,719,932 | 3/1973 | Cappon | 340/173 R |
| 3,747,072 | 7/1973 | Lodi et al. | 340/173 R |

*Primary Examiner*—Stuart N. Hecker
*Attorney, Agent, or Firm*—Howard P. Terry; Joseph M. Roehl

[57] ABSTRACT

A digital memory system employing a rectangular array of known MNOS variable threshold insulated gate field effect transistor memory cells is actuated by auxiliary circuits which provide a four-step operating sequence. The memory cells are arranged in word rows in which the gate electrodes of all memory cells in a given row are connected together and in bit columns having common source and common drain connections. The auxiliary circuits provide intermediate gate voltages to a selected row of memory cells in the first step of the operating cycle so as to read the information stored in the memory cells into a register. In the second step of the operating sequence, a large negative gate voltage is applied to the selected row to circumvent the cumulative effect that might arise from a succession of positive WRITE pulses. In the third operating step, the memory cells in the selected row are set to their least negative threshold value by an appropriate "clear" pulse, and in the fourth operating step information is written back into the selected memory cells from the register.

9 Claims, 3 Drawing Figures

PATENTED JUL 16 1974 SHEET 1 OF 3 3,824,564

INTEGRATED THRESHOLD MNOS MEMORY WITH DECODER AND OPERATING SEQUENCE

BACKGROUND OF THE INVENTION

1. Field of the Invention

The invention relates to computer memory circuits and more specifically to computer memory circuits employing variable threshold insulated gate field effect transistors as memory cells.

2. Description of the Prior Art

U.S. Pat. No. 3,508,211 entitled, "Electrically Alterable Non-Destructive Readout Field Effect Transistor Memory" and U.S. Pat. No. 3,590,337 entitled, "Plural Dielectric Layered Electrically Alterable Non-Destructive Readout Memory Element," issued to the present inventor and assigned to the present assignee, relate to varieties of variable threshold transistors useful as memory elements. Each element is comprised of a variable threshold insulated gate field effect transistor whose conduction threshold is electrically alterable by impressing a binary voltage between the gate electrode and the substrate in excess of a predetermined finite magnitude. The polarity of the voltage determines the sense in which the threshold is varied. Upon the application to the gate electrode of a fixed interrogation voltage having a value intermediate the binary valued conduction thresholds, the binary condition of the transistor can be sensed by monitoring the magnitude of the resultant source-drain current. The magnitude of the interrogation voltage is insufficient to change the preexisting conduction threshold so that non-destructive readout is achieved.

Several memory circuits employing such variable threshold field effect transistors have been devised. In general, however, these circuits do not permit single-bit by multiple word organization of any large number of memory bits. Furthermore, the design of such prior art circuits sacrifices a short read access time in order to provide a long information storage time.

SUMMARY OF THE INVENTION

The memory circuit of the present invention combines rapid access with long storage time capability by utilizing a four-step operating sequence in which each bit of information is read only once. The individual bits are read into a storage register in which external READ and WRITE manipulations are performed. The individual bits are then re-written into the corresponding memory cells.

DESCRIPTION OF THE PREFERRED EMBODIMENT

In the memory system of the present invention, a memory transistor is subjected to four operating steps in sequence. In the first, or "load" step, information stored in the variable threshold transistors forming a selected row of memory elements is read into a bit storage register. In the second or "preset" step, all of the variable threshold transistors in the same selected row are subjected to a large negative voltage that sets the threshold voltage in these transistors to its most negative value. The "preset" step in the operating sequence is introduced to insure that each memory transistor never sees more than one positive WRITE pulse in succession and therefore prevents an accumulation of consecutive positive WRITE pulses which might set the transistor to a positive threshold voltage whereby it could then be turned on without having been addressed. In the third or "clear" step of the operating cycle, all of the variable threshold transistors in the same selected row are set to their least negative threshold voltage. In the fourth or "store" step of the operating cycle, the transistors representing selected bits of the cleared word are again switched into a more negative threshold state in accordance with the data stored in the bit storage register. In the fourth step, either original or updated information can be written back into each memory cell.

Figure 1:
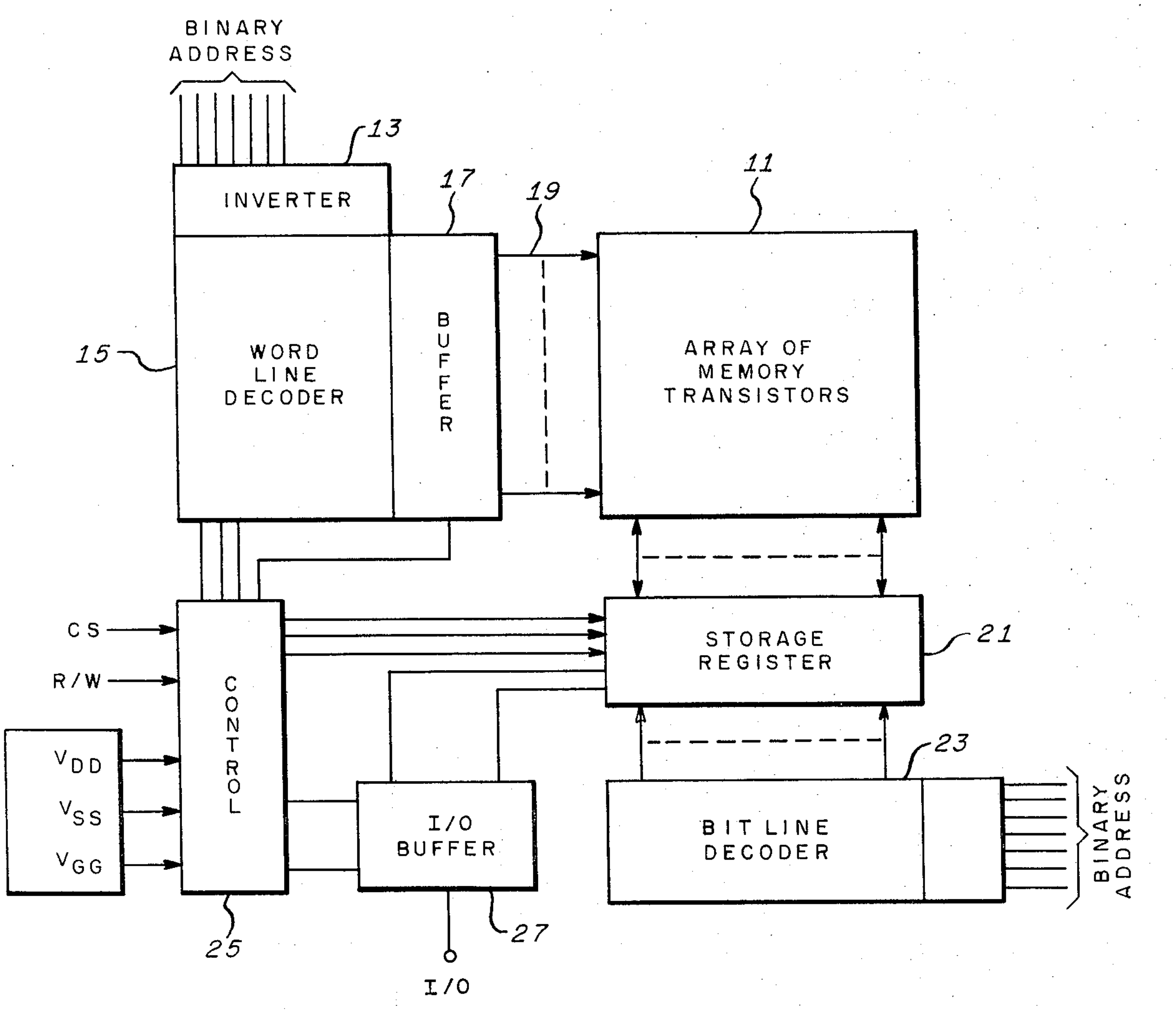
FIG. 1 is a block diagram of the memory system.

FIG. 1 is a block diagram of a typical circuit employing the principles of the invention. The memory itself includes a bank of variable threshold insulated gate field effect memory transistors arranged in a rectangular array 11. Typically, the array may be arranged in 128 horizontal word rows and 64 vertical bit columns.

For a 128 word row array, a 7 bit binary address signal is applied to an inverter 13 which converts each address bit into a 2-rail signal suitable for operation in a word line decoder 15.

A word line buffer 17 translates the signals from the word line decoder to a level required to operate the variable threshold transistors in the memory array. Thus the decoder 15 and buffer 17 cooperate to provide a source of suitable gate voltages for the memory transistors.

The output signals from the word line buffer 17 are applied to selected rows of memory transistors through individual word lines such as the word line 19.

Each of the 64 bit lines in the memory array is terminated by an individual bit register in the storage register 21. One of these individual bit registers is accessed at a time by a bit line decoder 23 in accordance with a 6 bit binary address signal applied to the decoder in accordance with signals from a control circuit 25.

The control circuit 25 is merely a switching circuit which sets the various parts of the system to suitable voltage levels during each of the four internal operating steps.

Binary information is read into and out of the memory system through an input-output buffer 27.

As indicated in FIG. 1, the memory system is energized by d.c. voltages $V_{DD}$, $V_{SS}$, and $V_{GG}$. For purposes of illustration, $V_{SS}$ will be assumed to be +5 volts for compatibility with TTL levels; $V_{GG}$ will be assumed to be −40 volts and the maximum voltage needed to drive various loads; $V_{DD}$ will be assumed to be −30 volts. Straightforward internal circuits will also be assumed to provide a voltage of $V_{DD}/2$ or −15 volts. Various references to these voltage levels in the following description will be assumed to be derived from these voltage sources.

The control circuit further receives control input R/W which determines whether the I/O contact functions as an input or an output point. A CS signal also applied to the control circuit 25 acts as a chip select voltage and can be made to perform a start function.

Figure 2:
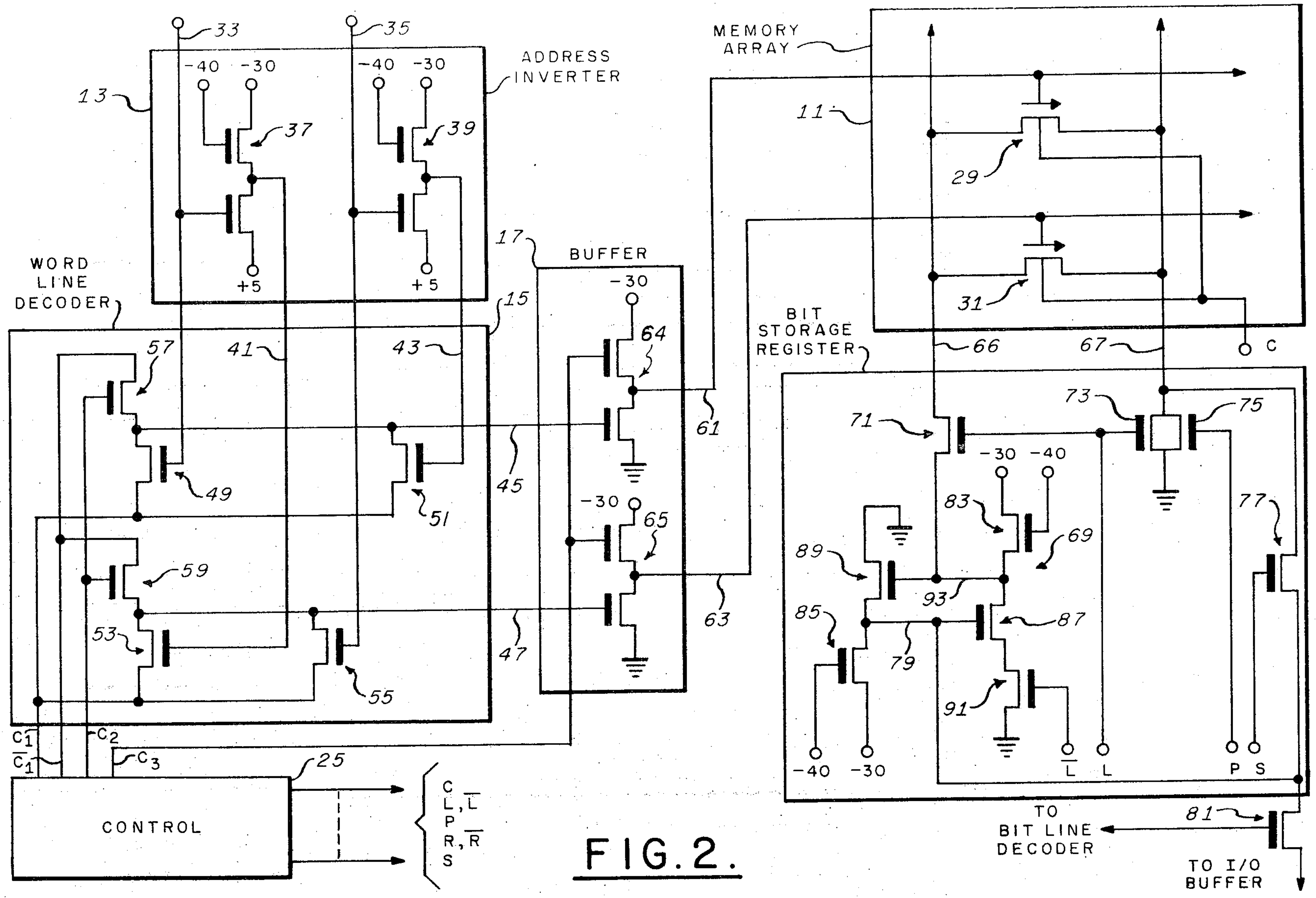
FIG. 2 and 3 are circuit diagrams useful in explaining the construction and operation of the memory system of the present invention.

FIG. 2 illustrates the construction and interrelationship of various components in the system. Since a practical memory circuit necessarily contains a large number of duplicate elements, FIG. 2 has been simplified by illustrating only the minimum number of these multiple elements necessary to explain the invention. Thus, for example, a memory array might contain 128 horizontal word rows each containing 64 variable threshold insulated gate field effect memory transistors. FIG. 2 merely illustrates first and second memory transistors 29 and 31 arranged in a single bit column and two word rows.

All of the transistors in the overall system will be understood to be conventional fixed threshold insulated gate field effect transistors, with the exception of the actual variable threshold memory transistors in the memory array.

The address inverter 13 is illustrated as having two input lines 33 and 35 for receiving a two-bit binary address signal. The input lines 33 and 35 are coupled to conventional complementing transistor pairs 37 and 39, respectively. Thus a high level signal applied to the input line 33 is coupled to the word line decoder 15 through that line but also produces a complementary voltage of essentially zero volts on a line 41. Conversely, a low level signal applied to the line 33 is directly coupled to the word line decoder, but its complement or a high level signal is also applied to the decoder through the line 41. Similarly, input signals applied to the line 35 appear in the word line decoder and their complement is applied to the word line decoder through a line 43.

The decoder is basically a conventional multiple NOR gate binary decoder. The conventional decoder, however, has been modified to permit conversion of the decoder output into its complement when desired by means of signals $C_1$, $\overline{C}_1$, and $C_2$ applied to the decoder from the control circuit 25.

The output signals from the word line decoder are applied to the buffer 17 by means of the word line decoder output lines 45 and 47.

The decoder output line 45 is coupled through decoder transistors 49 and 51 to the $C_1$ bus from the control circuit 25. Similarly, the output line 47 is coupled through decoder transistors 53 and 55 to the same bus from the control circuit. The decoder transistors 49 and 53 are serially connected to logic transistors 57 and 59 which are in turn connected to the $\overline{C}_1$ bus from the control circuit 25. The gate electrodes of the logic transistors 57 and 59 are connected to the $C_2$ bus from the control circuit 25.

The gate electrodes of the decoder transistors 49 and 51, associated with the output line 45, are connected to receive the true address signal applied to the line 33 and the complement of the address signal received on the line 35. Similarly, the decoder transistors 53 and 55 are connected to receive the true and complementary signals received on the lines 35 and 33, respectively.

The control circuit 25 operates as a straightforward switching means to connect various combinations of voltages from the aforementioned d.c. sources to the busses $C_1$, $\overline{C}_1$, $C_2$ and $C_3$.

During the "clear" step in the operating sequence, +5 volts ($V_{SS}$) is applied to the bus $C_1$, −30 volts ($V_{DD}$) is applied to the bus $\overline{C}_1$, and −40 volts ($V_{GG}$) is applied to the bus $C_2$.

As mentioned previously, the decoder is basically a NOR gate device. That is, a given word line is selected when all of the decoder transistors associated with that line are non-conducting. Thus, for example, if low and high level address signals were received on the terminals 33 and 35 respectively (binary 01), neither of the decoder transistors 49 and 51 associated with the output line 45 would be conducting and the line 45 would be the "selected" line. At the same time, both of the transistors 53 and 55 associated with the output line 47 would be conducting and the line 47 would be considered a "non-selected" line.

Again assuming that the lines from the control circuit were switched to the voltage sources indicated previously, and again assuming that the line 45 is the selected line, the line 45 would be at approximately the potential of the bus $\overline{C}_1$ (−30 volts). The non-selected line 47, however, would be at approximately +5 volts since the decoder transistors 53 and 55 associated with the line 47 are conducting It will be appreciated that practical memory arrays employ numerous word lines. In such situations, the word line decoder is connected according to well known principles so that only one input line is selected in response to any combination of binary address signals. All of the remaining lines remain in the non-selected state.

The buffer circuit 17 controls the level of the voltages applied to the word line 61 and 63 through transistor pairs 64 and 65, respectively. The level of the voltages applied to the line 61 and 63 therefore depends upon the degree of the conductivity of the upper transistors in the pairs 64 and 65. The conductivity of these transistors, in turn, depends upon the value of the $C_3$ signal from the control circuit 25.

Typical voltages applied to the busses $C_1$, $\overline{C}_1$, and $C_2$ suitable for use during the "clear" step of the operating sequence were previously described. At the same time, a voltage of −40 volts ($V_{GG}$) might be applied to the bus $C_3$. The buffer 17 will invert the signal on the output line from the word line decoder. Thus, the decoder and buffer combination act as a complementer during the "clear" step.

During the remaining three steps of the operating cycle, the bus $C_1$ is switched to −30 volts ($V_{DD}$), bus $\overline{C}_1$ is switched to +5 volts ($V_{SS}$), and $C_2$ is switched to −15 volts ($V_{DD}2$). Under these conditions, the word line decoder acts as a source follower since the lower voltage on the gates of the logic transistors increases the resistance of these devices so as to raise the load-to-driver ratio and thereby permit operation as a source follower.

In this situation, the decoder output line selected by the address will be near a +5 volt level. However, this low level voltage will be translated by the buffer into a high level on the word line. At the same time, the unselected decoder output lines will be at a high voltage level which the buffer will translate to a +5 volt level on all of the corresponding non-selected lines.

During the three steps in the operating sequence in which the word line decoder is switched to operate as a source follower, the control bus $C_3$ is set to control the level of the negative voltage placed on the word lines. During the "load" step the bus $C_3$ is switched to a value near ½ the writing voltage $V_{DD}$. During the "preset" and "store" steps, the full writing voltage $V_{DD}$ is required.

As explained previously, the memory array 11 is shown with only two variable threshold memory transistors 29 and 31 in this circuit so as to avoid undue complexity in the description. It will be appreciated that the word lines 61 and 63 would ordinarily be connected to the gate electrodes of multiple memory transistors arranged in the corresponding word line. The memory transistors 29 and 31 are shown in a single bit column and connected to the storage register through common source and drain lines 66 and 67. The substrates of the memory transistors are connected to a common terminal C.

The source line 66 is connected to a register flip-flop 69 through a source line transistor 71. The drain line 67 is coupled to ground through a drain line transistor 73. The gate electrodes of the transistors 71 and 73 are connected to a terminal L which is energized during the "load" step of the operating sequence so as to drive the transistors 71 and 73 into conduction at this time.

A transistor 75 in parallel with the transistor 73, has its gage electrode connected to a P terminal which is energized with a high voltage during the "preset" step of the operating sequence so as to drive the transistor 75 into conduction and thereby connect the drain lines of all memory transistors in the associated bit column to ground during this step.

The drain line 67 is further connected through a transistor 77 to the complement node line 79 of the flip-flop 69 and to the I/O buffer through a buffer-decoder transistor 81.

The gate electrode of the transistor 77 is connected to an S terminal which is energized during the "store" step of the operating sequence so as to drive the transistor 77 into conduction during this operating step. The buffer-decoder transistor 81 interconnects the bit storage register and the I/O buffer in accordance with binary address signals applied to the bit line decoder.

The flip-flop 69 includes a "load" transistor 83, a complement load transistor 85, a driver transistor 87, and a complement driver transistor 89. The driver transistor 87 can be connected to ground through a transistor 91 in response to $\bar{L}$ control signals. The $\bar{L}$ signals are effectively the complement of the L signals, and are applied to the transistor 91 in all steps of the operating cycle except the "load" step. A line 93, interconnecting the junction of the transistors 83 and 87 with the gate electrode of the complementary driver transistor 89 serves as the true node line of the flip-flop.

It will be appreciated that the bit storage register illustrated in FIG. 2 represents only one stage of the entire storage register. In an actual memory system, a separate bit storage register of the type illustrated in FIG. 2 would be coupled to each bit column in the memory array.

Figure 3:
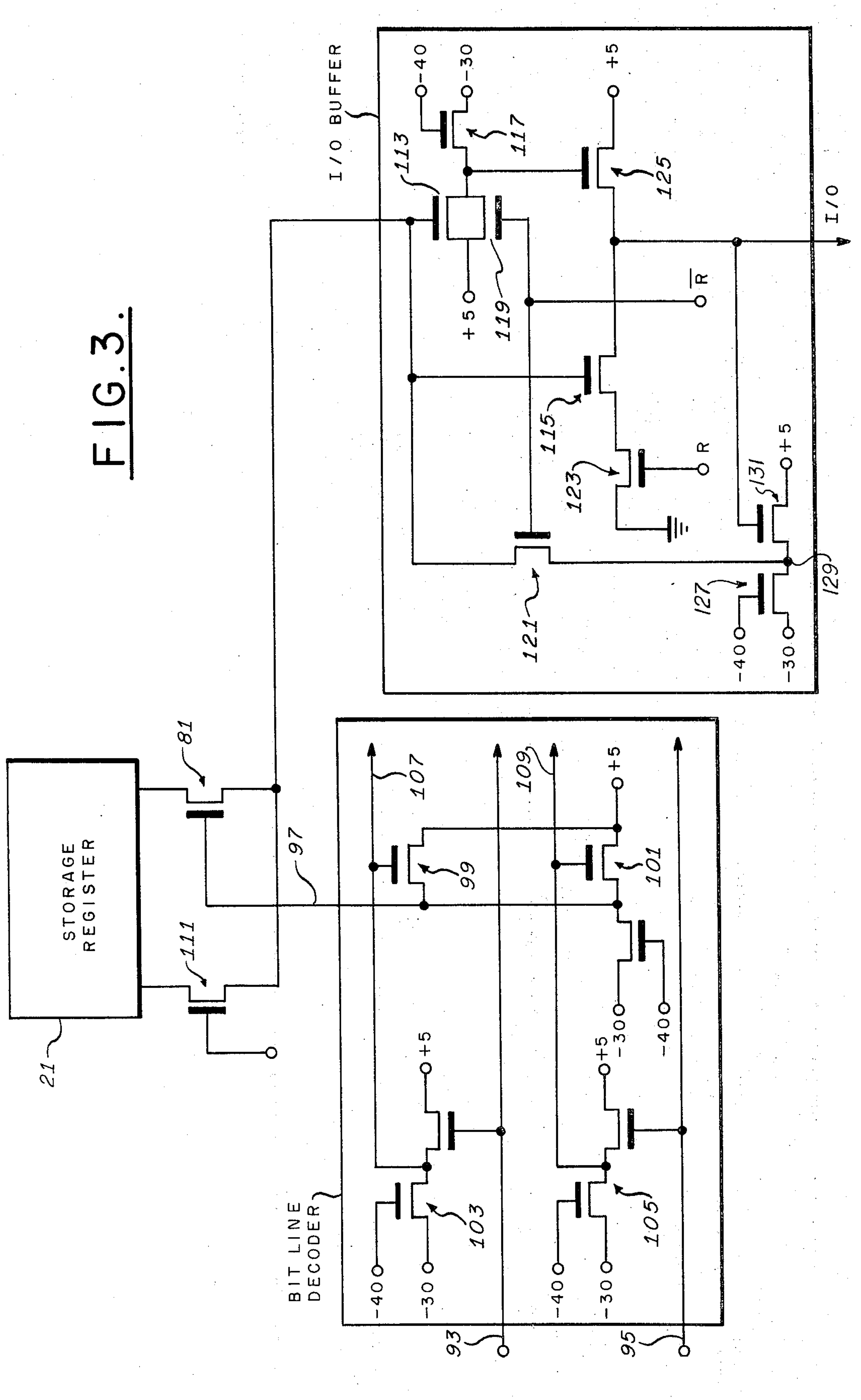

FIG. 3 illustrates the construction of the I/O buffer and the bit line decoder as well as the interconnections between these components and the storage register.

As in the case of the previously discussed components, only a single stage of the bit line decoder is illustrated in FIG. 3 so as to simplify the discussion.

The bit line decoder is constructed in the same fashion as the word line decoder except that the line decoder always operates as a multiple input NOR gate and never acts as a selective source follower. For this reason, the various transistors in the bit line decoder are permanently connected to the appropriate d.c. sources as indicated in FIG. 3. Any binary address signal applied to the terminals 93 and 95 selects a unique bit by driving the associated decoder output line such as the line 97 to a high voltage level which in turn drives the associated buffer-decoder transistor such as the transistor 81 into conduction.

As can be seen in the decoder illustrated in FIG. 3, decoder transistors 99 and 101 act as NOR gates. Transistor pairs 103 and 105 serve to provide a high level voltage to the gate buses 107 and 109, respectively, when the associated address line is at a low level. A high level voltage on the gate bus drives the associated decoder transistor into conduction and thereby provides a low level output signal on the output line. Conversely, a high level address signal switches the associated transistor pair so that the corresponding gate bus is essentially at zero voltage level and the associated decoder transistors remain non-conductive. When all of the decoder transistors connected to a given output line such as the line 97 are non-conductive, a high level voltage is applied to that output line. If any one of the decoder transistors connected to a given output line conducts, however, that output line will be driven to an approximately +5 volt level.

Thus, for the particular decoder stage illustrated in FIG. 3, the line 97 will be addressed when high level address signals are applied to both input terminals 93 and 95.

When a decoder-buffer transistor such as the transistor 81 is driven into conduction, the complement node line 79 (FIG. 2) is connected to the I/O buffer. All remaining decoder-buffer transistors (illustrated functionally as a single transistor 111) will, of course, be in a non-conducting state.

The I/O buffer represents the working interface between the memory itself and the external system. It presents information or receives it from the bit line buffer in response to a READ/WRITE control input.

All of the decoder-buffer transistors such as the transistor 81 are connected through a common line to the I/O buffer. This line is connected to the gate electrodes of an I/O buffer output transistor 113 and a first output driver transistor 115. The transistor 113 is serially connected with a load transistor 117 and returned to a +5 volt source ($V_{SS}$). A first WRITE transistor 119 is connected in parallel with the transistor 113. The gate electrode of the transistor 119 is connected to the corresponding gate electrode of a second WRITE transistor 121 which is also connected to the common line from the storage register. A READ control transistor 123 is connected between ground and the transistor 115. The transistor 115, in turn, is connected through a second output driver transistor 125 to the +5 volt d.c. source.

The gate electrode of the transistor 123 is connected to an R terminal and the gate electrodes of the transistors 119 and 121 are connected to an $\bar{R}$ terminal. These terminals are actuated in complementary fashion in response to READ or WRITE commands. Upon receipt of a READ command, switches in the control circuit provide a high level signal to the R terminal which turns on the transistor 123 and a complementary signal to the $\bar{R}$ terminal which cuts off conduction in the transistors 119 and 121. Upon receipt of a WRITE command, switches in the control circuit reverse the situation so that the transistor 123 is cut off whereas the transistors 119 and 121 are turned on.

The I/O terminal is connected to the junction of the transistors 115 and 125, and to a transistor network including a load transistor 127 connected to the input node (line 129) and an input driver transistor 131 connected to the +5 volt d.c. source. The input node (line 129) is further connected to the second WRITE transistor 121.

If information is to be read out of the memory into external circuitry, high and low level signals will be applied to the R and $\bar{R}$ terminals respectively in the I/O buffer. The high level signal applied to the terminal R will turn on the READ control transistor 123 so as to connect the first output driver transistor 115 to +5 volts. The corresponding signal applied to the terminal $\bar{R}$ disconnects the second WRITE transistor 121 from the input driver transistor 131 and leaves the first WRITE transistor 119 open. Under these conditions, a continuous path exists between the complementary node 79 in the storage register (FIG. 2) and the gates of the transistors 113 and 115.

If the binary state of the flip-flop 69 in the bit storage register is such that the complement node line 79 is at zero level, the flip-flop driver transistor 89 will connect the gates of the transistors 113 and 115 to +5 volts so as to open both of these transistors. The gate of the transistor 119 is also at this level under these conditions so that the gate of the transistor 125 is at a high voltage level which drives the transistor 125 into conduction and connects the I/O output terminal to the +5 volt source.

If the flip-flop 69 in the bit storage register had been in the opposite binary state so that the node line 79 was at a high level, both of the transistors 113 and 115 would have been turned on. Under these conditions, the transistor 125 would be turned off, the transistor 115 would connect the I/O terminal to the substrate potential through the transistor 123.

When information is to be written from an external source into an addressed bit, a WRITE command will be applied to the control circuit. This circuit will reverse the voltages applied to the R and $\bar{R}$ terminals in the I/O buffer so as to turn off the transistor 123 and turn on the transistors 119 and 121. The I/O terminal is now disconnected from ground by virtue of the non-conducting transistor 123. Furthermore, since the transistor 119 is now conducting, the gate electrode of the transistor 125 is at a low level and the transistor 125 is also non-conducting. Thus the I/O terminal is effectively disconnected from the sources of potential within the memory circuit.

At the same time, since the transistor 121 is now turned on, the I/O terminal is coupled to complement node line 79 in the bit storage register (FIG. 2) through the conducting transistor 121, the addressed buffer-decoder transistor (such as the transistor 81), and the input driver transistor 131.

The internal operation of the overall memory system can be understood by considering the four operating steps in sequence. In the first or "load" step, information is read out of each memory transistor in the selected row and loaded into the storage register.

Assuming that the various d.c. voltage sources provide the potentials indicated previously, the various control voltages will have the following values during the "load" step:

| | |
|---|---|
| $C=+5$ | $L=-30$ |
| $C_1=-30$ | $\bar{L}=+5$ |
| $\bar{C}_1=+5$ | $P=+5$ |
| $C_2=-15$ | $S=+5$ |
| $C_3=-15$ | |

Since the $C_3$ voltage applied to the decoder buffer is at a level of −15 volts, a voltage of approximately this level is applied to the selected word line so that reading of the memory transistors in that word line is accomplished with about ½ the negative WRITE voltage. The unselected word lines, of course, have a +5 volt level applied to their gates at this time.

For purposes of illustration, the circuit of the present invention has been described as one in which the conduction threshold of the memory transistors is shifted in a negative direction in response to suitable WRITE voltages. Thus during the "load" step, a memory transistor whose threshold voltage is less negative than the voltage applied to its gate electrode will permit conduction between the source and drain of that memory transistor, whereas the same pulse applied to the gate of a memory transistor whose threshold voltage has been shifted to a more negative value will remain non-conducting.

Since during the "load" step, the control line L is at −30 volts and the control line $\bar{L}$ is at +5 volts, the storage node line 93 of the flip-flop 69 in the bit storage register is connected to +5 volts through the turned-on transistors 71 and 73 if the selected memory transistor is conductive. In this situation, the flip-flop complement driver transistor 89 interrupts the connection to +5 volts and sets the complement storage node 79 to the −30 volt level through the complement load transistor 85.

In the event that the memory transistor threshold voltage had been shifted to a value more negative than the gate voltage applied during the "load" step, the memory transistor is not turned on. Under these conditions, the flip-flop load transistor 83 can charge the node line 93 to −30 volts and thus turn on the complement load driver transistor 89. This places the complement node line 79 at ground potential.

During the "load" step, the control voltage $\bar{L}$ places a +5 volt level on the transistor 91. This disconnects the driver transistor 87 from ground and thus prevents the presence of any negative voltage which might still be stored on the complement node 79 from interfering with the charging of the node 93.

In summary, assume that a memory transistor is considered to be storing a binary ONE when its threshold has been shifted to a large negative value. At the end of the "load" step, the complement node 79 of each bit storage register associated with a bit column whose selected memory transistor was storing a binary ONE will be at a low voltage level. Conversely, the complement node of each bit storage register associated with a memory transistor storing a binary ZERO will be at a high voltage level at the end of the "load" step.

During the second or "preset" step, all memory transistors in the addressed word are set to their most negative threshold voltage. The various control voltages are switched to the following values:

| | |
|---|---|
| $C=+5$ | $L=+5$ |
| $C_1=-30$ | $\bar{L}=-30$ |

-Continued

| | |
|---|---|
| $\bar{C}_1=+5$ | $P=-30$ |
| $C_2=-15$ | $S=+5$ |
| $C_3=-40$ | |

It will be noted that the control voltages to the word line decoder are the same as for the "load" step. However, the $C_3$ voltage has been increased so as to permit the maximum negative voltage to be placed on all the memory transistors of the addressed word. Furthermore, the control line P has been switched to a high level so as to drive the transistors 75 in the bit storage registers into conduction and thereby connect the drain lines to +5 volts. Since control line L is at a +5 volt level, the transistor 71 is non-conducting and all sources and drains of the memory array are effectively at the substrate potential. The large gate voltage causes all memory transistors in the selected word row to assume their most negative threshold voltage levels. The information read out of these memory transistors during the previous "load" step remains undisturbed in the storage register.

During the third or "clear" step, all of the memory transistors in the selected word row are set to their least negative threshold voltage. The various control voltages are switched to the following levels:

| | |
|---|---|
| $C=-30$ | $L=+5$ |
| $C_1=+5$ | $\bar{L}=-30$ |
| $\bar{C}_1=-30$ | $P=+5$ |
| $C_2=-40$ | $S=+5$ |
| $C_3=-40$ | |

For the "clear" step, it will be remembered that the word line decoder operates in its inverter mode so that all non-selected word lines are placed at −30 volts and the one selected line is at +5 volts. At the same time, control line C has placed the common substrate of all memory transistors at a voltage of −30 volts. Therefore, both the substrate and the gate electrodes of all memory transistors in the selected word row are at −30 volts and there is no potential applied across the dielectric of these memory transistors. However, since a zero voltage has been applied to the gate electrodes of all of the transistors in the selected word row, these transistors are effectively subjected to a positive potential of sufficient magnitude to shift the conduction thresholds of these transistors to their least negative threshold voltage. Since both the L and P control voltages are zero during the "clear" step, the storage registers are isolated from the memory array during this step and they still retain the information originally read out of the memory array during the "load" step.

During the "store" step of the operating cycle, information from the storage register is rewritten into the selected word line of the memory array.

The various control voltages are switched to the following values:

| | |
|---|---|
| $C=+5$ | $L=+5$ |
| $C_1=-30$ | $\bar{L}=-30$ |
| $\bar{C}_1=+5$ | $P=+5$ |
| $C_2=-15$ | $S=-30$ |
| $C_3=-40$ | |

During the "store" step, information is written back into the memory transistors by means of a channel shielding technique described in U.S. Pat. No. 3,618,051 issued to Robert E. Oleksiak, and assigned to the present assignee. In this technique, the gate electrodes of all transistors are subjected to a high level WRITE voltage. In those memory transistors in which a large threshold shift is to be accomplished, a voltage near the level of the gate voltage is applied to the drain electrode through a series resistor and the source electrode is grounded. The conducting channel assumes ground potential and the dielectric is subjected to the full WRITE voltage. However, in those memory transistors in which the threshold shift is to be inhibited, the drain electrode is maintained at the same voltage level but the source electrode is left floating. Thus, a source-to-drain channel is established, but it is maintained at a voltage level near that of the gate electrode so that effectively little voltage is applied across the dielectric and the conduction threshold of the memory transistor is left undisturbed.

In applying these principles to the circuit of the present invention, the control voltages are switched to return the decoder to the source follower mode during the "store" step. The selected word line is again subjected to the maximum WRITE voltage and the substrate voltage is reduced to zero.

The individual memory transistors in the selected word line are either permitted to retain the least negative threshold voltage established during the "clear" step by utilizing the channel shielding inhibiting technique or changed to the most negative threshold in accordance with the potential stored in the complement node 79 of the associated bit storage register.

It will be noted that the control voltage S is now at a high level so that the transistor 77 is conducting. However, the gates electrodes of the transistors 71, 73 and 75 are at a low level so that these transistors are non-conducting. Thus both the sources and drains of the memory transistors in the selected line are connected through the memory transistor and the transistor 77 to the complement node line 79.

If the complement driver transistor 89 is conducting due to a stored −30 volts on the node line 93, the complement node 79 will be connected to ground. Under these conditions, the large negative voltage applied to the gate electrode of the associated memory transistor in the selected word line will establish a large potential across its dielectric and the threshold voltage will be switched to its most negative value. This will be the same condition that the memory transistor exhibited before the information was read out of that transistor during the "load" step.

Conversely, if the complement drive transistor 89 was left in the non-conducting state due to a ground potential on the node 93, the complement node 79 will be at a high level and the source and drain of the selected memory transistor in the associated bit column will be charged to −30 volts by way of transistor 85. Resultant shielding channel will inhibit any change in the conduction threshold from the least negative value established during the "clear" step.

The control circuit has been indicated only functionally since this circuit may be a straightforward switching circuit which switches control voltages from internal voltage sources to the appropriate terminals for each of the steps in the operating sequence. This switching function, for instance, could be controlled by 7 synchronized clocks external to the chips.

Basically, the control circuit operates as a multiple switching means in which individual double throw switches connect respective control lines to one or the other appropriate internal voltage sources during successive steps in the operating sequence, and in which double pole, double throw switches connect the L, $\bar{L}$ and R, $\bar{R}$ control lines to complementary sources. The switching sequence is described in the foregoing discussion.

The switching function may be controlled in a straightforward manner. In a practical system, for instance, synchronized clocks, external to the chip, might be used for this purpose.

External reading and writing in the circuit of the invention is accomplished by manipulating the information in the storage register. In order to read information into circuitry external to the memory circuit chip, a signal is presented to a READ/WRITE control which permits the data from the selected bit line to be presented at the I/O contact. Since this occurs during the first step of the four-step cycle, access time is minimized. In order to write a new bit into the memory, the pertinent READ/WRITE signal causes the addressed bit in the storage register to assume the state required by the signal at the I/O contact and this bit is then recirculated through the addressed word during the fourth or "store" step.

In the circuit of the present invention, each bit of information is read only once, and then internally stored and rewritten. This form of destructive READ operation results in a predictible maximum quiescent storage which is independent of disturbed signals that would affect a repeatedly read but not re-written transistor. Furthermore, the fact that each bit is read only once permits the use of a high READ voltage. The high signal permits more rapid readout.

Furthermore, the circuit of the present invention permits single-bit multiple word organization of any large number of memory bits. The circuit also incorporates the capability of refreshing itself should the time needed exceed the inherent storage time of the memory transistors.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. A digital memory system comprising, an array of variable threshold insulated gate field effect memory transistors having source, drain, and gate electrodes, said memory transistors being arranged in word rows and bit columns on a common substrate, said memory transistors being characterized in that they display a conduction threshold which may be shifted to a high level by the application of a WRITE voltage across the gate insulator of the transistor and to a low level by the application of an inverted WRITE voltage across the gate insulator, said transistors being further characterized in that information may be read out of said transistor by application of an intermediate-valued READ voltage across the gate insulator, a source of gate voltages for the memory transistors in said array, said source including means to provide voltages of READ or WRITE magnitude to individual word rows as desired, means to apply a desired voltage to said substrate, individual bit storage registers corresponding to each bit column in the memory array, holding means in each storage register for temporarily retaining information to be stored in a selected memory transistor in the associated bit column, means for optionally coupling said holding means to either the source or drain electrodes of all memory transistors in the associated bit column, means in each bit storage register for optionally connecting the drain electrodes of all memory transistors in the associated bit column to said common substrate, means for simultaneously applying a WRITE voltage to a selected word row from said source of gate voltages, for coupling each of said holding means to the source electrodes of the associated memory transistors, and for grounding the drain electrodes of all memory transistors so that information being stored in the memory transistor in the selected word row is loaded into the associated holding means, means for simultaneously applying a WRITE voltage to a selected word row from said source of gate voltages, for decoupling said holding means from said source and drain electrodes, and for grounding all of said drain lines so that the conduction thresholds of the memory transistors in the selected word row are preset to said high level, means for simultaneously applying a zero voltage and a WRITE voltage from said source of gate voltages to selected and unselected word rows respectively, for decoupling said holding means from said source and drain electrodes and for applying a WRITE voltage to said substrate so that the conduction thresholds of all of the memory transistors in the selected row are cleared to said low level, means for simultaneously applying a WRITE voltage to the memory transistors in a selected word row, for coupling said holding means to the drain electrodes of the memory transistors in the respective bit columns so that each memory transistor in the selected word row is exposed to a gate insulator voltage in accordance with the information being held in the corresponding holding means.

2. The memory system of claim 1 further including a source of control signals for controlling the mode of operation of components in the memory system, said memory system further being characterized in that said source of gate voltages includes word line decoder means for selecting a particular word row in the memory array in accordance with received binary address signals and buffer means for determining the magnitude of the voltages to be applied to word rows selected by said decoder means, said decoder means further including logic means for providing relatively high and low level signals to selected and unselected word rows, respectively, in response to first combination of control signals and for reversing the relative magnitude of the word row signals in response to a second combination of control signals.

3. The memory system of claim 2 wherein said source of control signals includes a multiple voltage d.c. source and control means for switching selected voltages from said d.c. source to various components in the memory system so as to provide control signals for these components.

4. The memory system of claim 3 wherein said buffer means includes means to limit said relatively high level word row signal to a voltage of READ magnitude in response to a buffer control signal of one value and to limit said high level word row signal to a voltage of WRITE magnitude in response to a buffer control signal of another value.

5. The memory system of claim 4 in which said word line decoder means is a multiple NOR gate binary decoder arranged so that each decoder output line is coupled to a first bus from said control means through a different plurality of decoder field effect transistors, said decoder being further arranged so that all decoder field effect transistor coupled to a given decoder output line are driven to cutoff only when the decoder output line corresponds to a received word line address signal, each of said decoder output lines being further coupled to a second bus from said control means through a separate logic transistor, each of said logic transistors having a gate electrode connected to said control means through a third bus, said first and second combinations of control signals being applied to said first, second and third buses.

6. The memory system of claim 5 wherein the control signals in said first combination are proportioned so as to provide a relatively high voltage only on the unselected decoder output lines and the control signals in said second combination are proportioned to provide a relatively high voltage only on the selected decoder output line, and wherein said decoder buffer includes means to provide word line voltages that represent the complement of the respective decoder output voltages.

7. The memory system of claim 6 further including a bit line decoder and an I/O buffer for coupling external circuitry to a bit column selected by said bit line decoder in accordance with a received bit line address signal.

8. The memory system of claim 7 wherein the I/O buffer is coupled to the holding means in each bit storage register through separate buffer-decoder field effect transistors, each of said buffer-decoder field effect transistors having a gate electrode separately and selectively actuated by said bit line decoder, said I/O buffer including terminal means for connection to external circuitry, said I/O buffer further containing first gating means for reading information out of the holding means and into external circuitry through said terminal means and second gating means for reading information out of external circuitry and into said holding means through said terminal means.

9. A digital memory system comprising an array of variable threshold insulated gate field effect memory transistors having source, drain, and gate electrodes, said memory transistors being arranged in word rows and bit columns on a common substrate, said memory transistors being characterized in that they display conduction thresholds which can be shifted to first and second levels by the application of gate voltages of first and second predetermined magnitudes, respectively, a multiple voltage d.c. source, control means for switching voltages from said d.c. source to selected components in said system so as to provide control signals for said components, word line decoder means for selecting a different row of memory transistors for each value of binary address signal applied to said decoder, said word line decoder means including logic means for producing high or low level decoder output signals for the selected row of memory transistors and low or high level signals for the unselected rows in response to first and second combinations of control signals, respectively, from said control means, word line buffer means for converting the word line decoder output signals to appropriate word line voltages for the gate electrodes of the memory transistors, said buffer means including means to invert the level of the word line decoder output signal and means to adjust the amplitude of the resulting high level word line voltages in response to buffer control signals from said control means, means for driving said source line and said drive line transistors into conduction in response to load control signals from said control means so as to couple said bit storage registers to the corresponding bit column and thereby provide information to be read out of the selected row of memory transistors and into the storage registers, means for applying said second combination of control signals to said word line decoder and an intermediate level buffer control signal to the adjustment means in said word line buffer such that the resulting selected word line voltage lies between said first and second predetermined magnitudes during the occurrence of a load control signal whereby information is read out of each memory transistor in the selected word line and into the bit storage register in accordance with the level of the conduction threshold in the transistor, means in said storage register for grounding the drain lines of all memory transistors in response to a present control signal and simultaneously isolating each holding means from the memory transistors, means to apply said second combination of signals to said word line decoder and a high level buffer control signal to the adjustment means in said word line buffer during the occurrence of a preset control signal, said high level buffer control signal having a magnitude such that the resulting selected word line voltage exceeds the larger of said first and second predetermined magnitudes whereby the conduction thresholds of all memory transistors in the selected word line are shifted to the larger of said first and second levels, means to apply said first combination of control signals to said word line decoder and a high level buffer control signal to the adjustment means in said word line buffer whereby a low level signal is applied to the selected word line and a voltage equal to the larger of said first and second predetermined magnitudes is applied to the unselected word lines, means to supply a control signal to said substrate having a magnitude and polarity equal to the voltage applied to the selected word line during the occurrence of said first combination of control signals whereby the memory transistors in the selected word row are subjected to a reverse polarity voltage equal to the larger of said first and second predetermined magnitudes and the memory transistors in the unselected word rows are subjected to low voltage so that the thresholds of all memory transistors in the selected row are set to the smaller of said first and second levels, means to couple each temporary holding means to the drain line in the corresponding memory bit column and to decouple the holding means from the corresponding source line in response to a store control signal from said control means so that the conducting channels in the memory transistor are charged to a voltage indicative of the information being retained in the respective holding means, means to apply said second combination of signals to said word line decoder and a high level buffer control signal to the adjustment means in said word line buffer during the occurrence of a store control signal so that the gate electrodes of the memory transistors in the selected row are at a high voltage and those in the unselected row are at a low voltage whereby the memory transistors in the selected word line are subjected to net gate voltages in accordance with the information being temporarily stored in the corresponding holding means.

* * * * *